R. KITSON
Car Brake.

No. 38,749.

Patented June 2, 1863.

Witnesses:
J W Coombs
James H Gridley

Inventor:
R Kitson
per Munn & Co
Attorneys

UNITED STATES PATENT OFFICE.

RICHARD KITSON, OF LOWELL, MASSACHUSETTS.

IMPROVEMENT IN FRICTION-BRAKES.

Specification forming part of Letters Patent No. 38,749, dated June 2, 1863.

*To all whom it may concern:*

Be it known that I, RICHARD KITSON, of Lowell, in the county of Middlesex and State of Massachusetts, have invented a new and Improved Friction-Brake for Machinery and other Purposes; and I do hereby declare that the following is a full, clear, and exact description of the same, reference being had to the accompanying drawings, forming part of this specification, in which—

Figure 2:
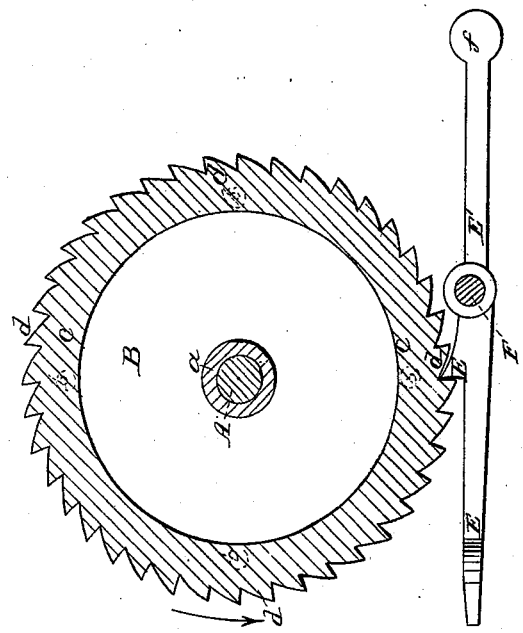
Figure 1:
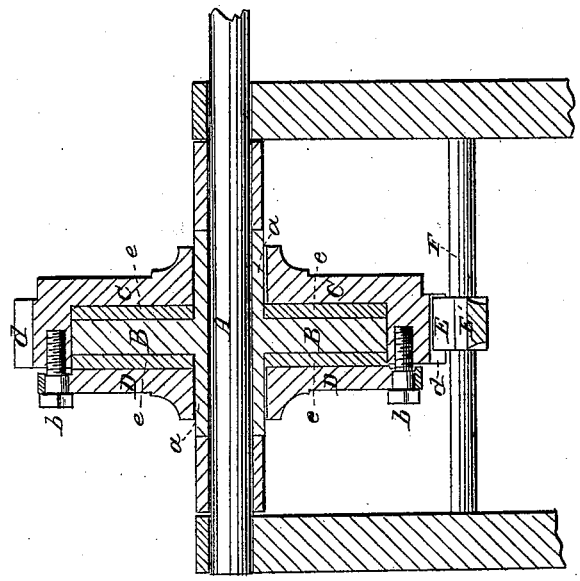

Figure 1 is a vertical section of my improved brake parallel with the shaft to which it is applied. Fig. 2 is a vertical section of the same at right angles to the shaft.

Similar letters of reference indicate corresponding parts in both figures.

My invention is composed of a disk firmly secured to a shaft or axle and inclosed within a box or casing which is fitted to turn upon the shaft, but so clamped upon the said disk by means of screws as to produce any desirable degree of fricton, and which is furnished upon its periphery with a surrounding series of ratchet or other teeth, in relation to which a stop is so applied as to be capable of being made to engage with any tooth, and thereby to stop the revolution of the box and cause it by its friction upon the disk to gradually stop or retard the velocity of the revolution of the shaft.

To enable others to make and use my invention, I will proceed to describe its construction and operation.

A is the shaft or axle, and B is the disk made with a hub, *a*, projecting from both sides of it to give it a long bearing on the shaft or axle, and keyed or otherwise firmly secured to the latter so as to be incapable of turning thereon.

C and D are two pieces of which the box is composed, the piece C consisting of a disk having a rim, *c*, projecting from its inner side, of sufficient depth to cover the periphery of the disk B, and having upon its own outer periphery the series of teeth *d d* extending all round it, and the piece D consisting of a simple disk. These two pieces are bored centrally to fit loosely to the hub of the disk B— one on each side of the said disk—and their inner faces are made perfectly parallel with the faces of the said disk. *b b* are screws passing freely through holes in the disk D and screwing into tapped holes in the rim of the disk C for the purpose of making them clamp the disk B tightly enough to produce a desirable degree of friction between them and the latter disk. *e e* are disks of leather or other comparatively soft material, placed between the disk B and the two disks C and D to render the friction between them uniform.

E is the stop, of suitable shape to enter the recesses between the teeth *d d*, formed upon a lever, E', which is arranged upon a rock-shaft or fulcrum, F, in suitable relation to the box C D, to enable the stop to engage with any one of the teeth *d d*. The said lever is loaded at *f* to bring the stop into gear with the teeth when the lever is left free.

The operation of the brake is as follows: The lever is held with the stop E out of gear with the teeth *d d*, and the box C D rotates with the shaft until the brake is desired to come into operation, when the lever is liberated to let the stop come into gear, and so stop in a positive manner the further revolution of the box C D. The friction, which then takes place between the said box and the disk B, gradually stops or retards the velocity of the revolution of the said disk and its shaft or axle and any machinery with which they are connected.

This brake, it will be understood, is brought into action without the direct application of any power to produce the friction at the time it is required to act.

The lever E' may be so loaded that instead of requiring to be held to keep the stop E out of gear it may be out of gear in its normal condition and be brought into gear by pressing down one end.

This brake may be applied to vehicles, to windlasses, and to machinery generally.

What I claim as my invention, and desire to secure by Letters Patent, is—

The brake, composed of the disk B, fast upon the shaft or axle, the toothed box C, clamped upon the said disk, and the stop E to act upon the teeth of the box, the whole combined to operate substantially as and for the purpose herein specified.

RICHARD KITSON.

Witnesses:
 HORATIO G. F. CORLISS,
 PHINEAS WHITING.